(12) United States Patent
Riikonen et al.

(10) Patent No.: US 7,876,885 B2
(45) Date of Patent: Jan. 25, 2011

(54) METHOD AND SYSTEM FOR ESTABLISHING A COMMUNICATION SYSTEM

(75) Inventors: Arto Riikonen, Espoo (FI); Hannu Honkala, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 1500 days.

(21) Appl. No.: 10/476,267

(22) PCT Filed: Apr. 30, 2002

(86) PCT No.: PCT/IB02/02712

§ 371 (c)(1),
(2), (4) Date: Dec. 8, 2003

(87) PCT Pub. No.: WO02/089448

PCT Pub. Date: Nov. 7, 2002

(65) Prior Publication Data

US 2004/0127209 A1 Jul. 1, 2004

(30) Foreign Application Priority Data

Apr. 30, 2001 (GB) ................................. 0110542.8

(51) Int. Cl.
*H04M 1/64* (2006.01)
*H04M 11/00* (2006.01)

(52) U.S. Cl. ................................. 379/88.17; 379/88.13
(58) Field of Classification Search ............... 379/88.17
See application file for complete search history.

(56) References Cited

U.S. PATENT DOCUMENTS

| | | | |
|---|---|---|---|
| 6,477,150 B1 * | 11/2002 | Maggenti et al. ............ 370/312 |
| 6,523,023 B1 * | 2/2003 | Sonnenberg ........................ 1/1 |
| 6,567,855 B1 * | 5/2003 | Tubbs et al. ................. 709/232 |
| 6,771,639 B1 * | 8/2004 | Holden ......................... 370/352 |
| 6,965,614 B1 * | 11/2005 | Osterhout et al. ............ 370/466 |
| 6,965,767 B2 * | 11/2005 | Maggenti et al. ............ 455/416 |
| 7,068,769 B1 * | 6/2006 | Weaver et al. ............. 379/201.1 |

(Continued)

FOREIGN PATENT DOCUMENTS

WO   WO 99/29081   6/1999

(Continued)

OTHER PUBLICATIONS

The SIP Buddy List System Advanced Internet Services Final Project, Online 1998, XP002188925, retrieved form Internet: http://www.cs.columbia.edu, retrieved on Jan. 30, 2002.

(Continued)

*Primary Examiner*—Joseph T Phan
(74) *Attorney, Agent, or Firm*—Squire, Sanders & Dempsey, LLP

(57) ABSTRACT

A method for processing a request from a first terminal to establish a communication session between the first terminal and a second terminal, the first terminal and the second terminal being operable to communicate via a telecommunication network, the method comprising: receiving at the telecommunication network a request from the first terminal to establish a communication session with the second terminal; determining whether the second terminal is available to support the communication session; and if the second terminal is determined not to be available to support the communication session, transmitting to the first terminal the address of a data set corresponding to the second terminal.

17 Claims, 2 Drawing Sheets

U.S. PATENT DOCUMENTS

| | | | |
|---|---|---|---|
| 7,277,533 B2 * | 10/2007 | Gilleland | 379/201.01 |
| 7,453,801 B2 * | 11/2008 | Taneja et al. | 370/230 |
| 7,463,584 B2 * | 12/2008 | Allan et al. | 370/234 |
| 2002/0116531 A1 * | 8/2002 | Chu | 709/246 |
| 2003/0217109 A1 * | 11/2003 | Ordille et al. | 709/206 |
| 2004/0013089 A1 * | 1/2004 | Taneja et al. | 370/235 |
| 2005/0254440 A1 * | 11/2005 | Sorrell | 370/264 |

FOREIGN PATENT DOCUMENTS

| | | |
|---|---|---|
| WO | WO 9929081 A1 * | 6/1999 |
| WO | WO 00/52898 | 9/2000 |
| WO | WO 00/79741 A1 | 12/2000 |
| WO | WO 00/79756 A2 | 12/2000 |

OTHER PUBLICATIONS

Xu dong Meng, et al—Department of Communications Engineering, Nanjing University of Posts and Telecommunications., "SIP based IP Session Control Technology", Dec. 2000, pp. 48-52.

* cited by examiner

METHOD AND SYSTEM FOR ESTABLISHING A COMMUNICATION SYSTEM

This invention relates to a messaging system.

In telecommunication systems, when one subscriber (the A-subscriber) calls another subscriber (the B-subscriber) in order to have a conversation over a voice channel it is possible that the B-subscriber may be unobtainable. This can happen for instance if the B-subscriber's equipment is not connected to the telecommunication network, or if the B-subscriber does not answer the call, or if the B-subscriber is already engaged in another session.

When the B-subscriber is unobtainable, it can be desirable for the A-subscriber to be given a message to report that fact. The message is often given as an audio message, which can be a generic voice message or a personal voice message pre-recorded by the B-subscriber. One method to give the message is by an answering device included in the B-subscriber's equipment. An example is a typical home answering machine as can be connected to a conventional land-line network, which can play a pre-recorded message over a voice communication channel from itself to the A-subscriber. Another method to give the message is by a messaging device included in the telecommunication network equipment. These systems are implemented in, for instance, IP-based or softswitch systems. The B-subscriber can record a message, and manage a voice mailbox either using dial tones or voice control. The transmission of the announcement to the A-subscriber is performed using the normal voice call means. This method has the advantage that the message can be provided even if the B-subscriber's equipment is not connected to the network at the time.

Conventionally, a messaging device included in the telecommunication network equipment is invoked when the network determines that the A-subscriber cannot be connected to the B-subscriber. The voice communication channel that would otherwise have been established between the A-subscriber and the B-subscriber is established between the A-subscriber and the messaging device. The messaging device retrieves a stored message and plays that message to the A-subscriber over that voice communication channel. The message could be a standard stored message or could be an individual stored message corresponding to the B-subscriber, which the B-subscriber has previously recorded.

The messaging arrangements described above have in common that the message is in voice/audio format and that it is sent to the A-subscriber over the same channel as the A-subscriber would have used to speak to the B-subscriber if he had been available.

Some PBX (private branch exchange) networks offer the possibility to send predefined or user-definable text messages which are stored and set in the PBX. Such PBXs are used with proprietary telephones that are arranged to display the text.

As communication increasingly moves to more diverse electronic media the messaging methods described above might come to be perceived as being somewhat restrictive. For example, in the fixture subscribers may wish to pass video, text or graphic messages instead of audio messages.

SIP (session initiation protocol) has been developed to perform call/session control functions including assisting in establishing IP (internet protocol) sessions between subscribers. The SIP protocol provides a number of standardised requests and responses by means of which the session control functions may be performed between terminals. The SIP protocol is published as IETF RFC 2543 (and revisions), currently available from http://www.ietf.org/rfc/rfc2543.txt?number=2543. The SIP protocol specifies a means whereby information can be transferred during session setup, but the protocol is lightly standardised and other than for essential session functions it does not specify the nature of the content that is carried by SIP messages.

According to one aspect of the present invention there is provided a method for processing a request from a first terminal to establish a communication session between the first terminal and a second terminal, the first terminal and the second terminal being operable to communicate via a telecommunication network, the method comprising: storing at the network the address of a data set corresponding to the second terminal; receiving at the telecommunication network a request from the first terminal to establish a communication session with the second terminal; determining whether the second terminal is available to support the communication session; and if the second terminal is determined not to be available to support the communication session, transmitting to the first terminal the address of a data set corresponding to the second terminal.

According to a second aspect of the present invention there is provided a SIP server of a communication network, the SIP server being configured to process SIP messages to establish communication sessions between terminals operable to communicate via the network, and to, in the event that a request from a first terminal to establish a communication session with a second terminal cannot be satisfied, transmit to the first terminal the address of a data set corresponding to the second terminal.

The method may comprise the step of, if the second terminal is determined to be available to support the communication session, establishing a communication session between the first terminal and the second terminal.

The data set may be a data file of a format in which a text, audio or video element can be embedded. The data file may be formatted in a mark-up language.

The address is an address in an address space of a publicly accessible data network. The publicly accessible data network may be the internet. The address may be a uniform resource locator.

The method may comprise the steps of: transmitting a request for the data set from the first terminal to the address; and transmitting the data set to the first terminal.

The first terminal maybe configurable to automatically transmit a request for the data set on receiving the address of the data set. Having received the address of the data set, the first terminal may be operable in response to user input to transmit the request for the data set.

The method may comprise the step of the first terminal presenting content of the data set to a user of the first terminal.

The communication session may be a voice communication session.

The first terminal may be configured to receive the data set over a data communication link.

The address of the data set may be transmitted to the second terminal in conjunction with an indication that the communication session cannot be established.

The address of the data set may be transmitted to the first terminal in a SIP message.

The data set may be a data file of a format in which a text, audio or video element can be embedded. The data file may be formatted in a mark-up language.

The method may comprise the step of storing the address of the data set. Alternatively, the method may comprise the step of generating an address of the data set as a function of an indication of the identity of the second terminal.

According to a third aspect of the present invention there is provided a method for processing a request from a first terminal to establish a communication session between the first terminal and a second terminal, the first terminal and the second terminal being operable to communicate via a telecommunication network, the method comprising: storing a data set corresponding to the second terminal, the data set being formatted in a mark-up language and having a media file embedded in it; receiving at the telecommunication network a request from the first terminal to establish a communication session with the second terminal; determining whether the second terminal is available to support the communication session; and if the second terminal is determined not to be available to support the communication session, transmitting the data set to the second terminal.

According to a further aspect of the present invention there is provided a SIP server of a communication network, the SIP server being configured to process SIP messages to establish communication sessions between terminals operable to communicate via the network, and to, in the event that a request from a first terminal to establish a communication session with a second terminal cannot be satisfied, transmit to the first terminal a data set corresponding to the second terminal, the data set being formatted in a mark-up language and having a media file embedded in it.

The method may comprise the step of, if the second terminal is determined to be available to support the communication session, establishing a communication session between the first terminal and the second terminal. The media file may represent a text, audio or video element. The data file may be formatted in HTML or XML.

The method may comprise the step of the first terminal presenting content of the data set to a user of the first terminal.

The communication session may be a voice communication session.

The data set may be transmitted to the first terminal over a data communication link.

The data set may be transmitted to the second terminal in conjunction with an indication that the communication session cannot be established. That message and/or the data set may be transmitted to the first terminal in a SIP message.

Due to the flexible nature of the invention, the invention is not limited to using the SIP protocol in a certain way. In addition, instead of SIP, a derivative of SIP could be used.

The present invention will now be described by way of example with reference to the accompanying drawing, in which.

Figure 1:
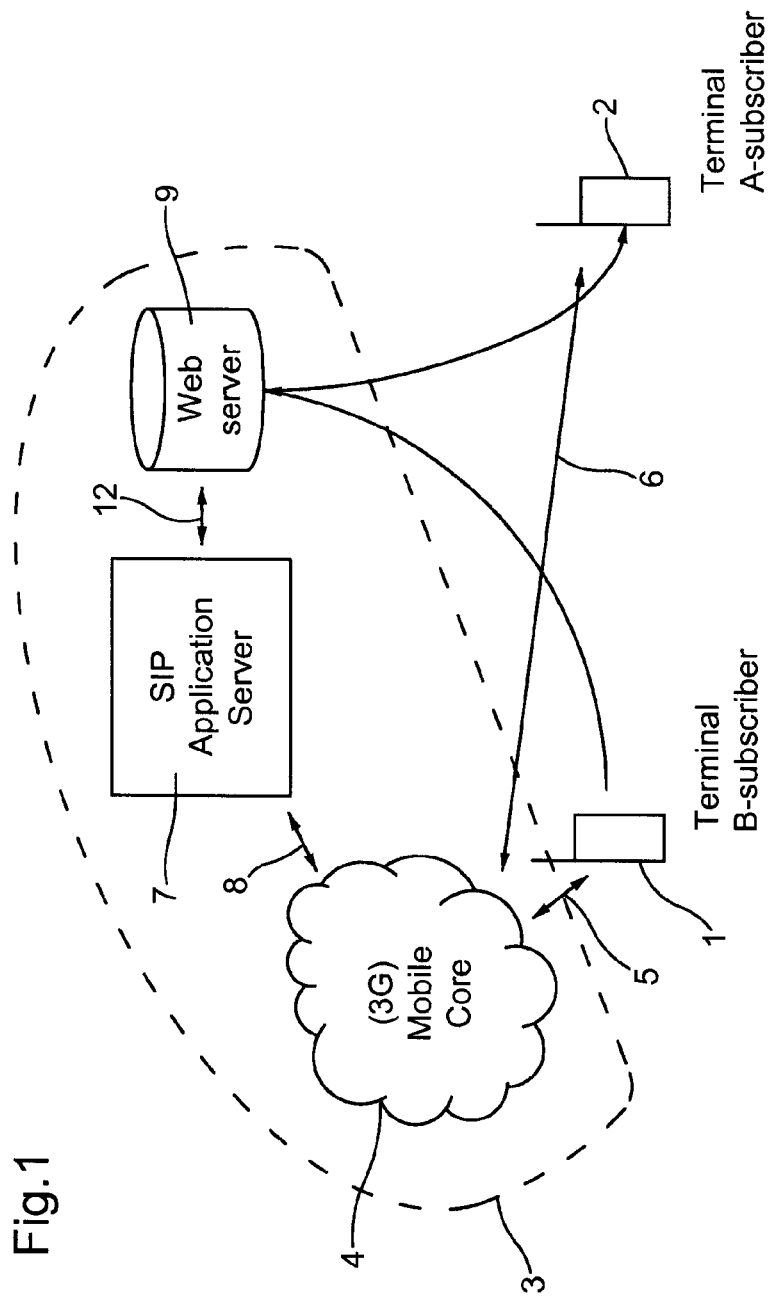
FIG. 1 is a schematic diagram of a telecommunication system.

In the telecommunication system of FIG. 1, terminals 1 and 2 are capable of communicating with each other via a network shown generally at 3. Each terminal is considered to be operated by a subscriber. Typically a subscriber will be identified by means of an identification code stored in the terminal, for example by a SIM (subscriber identity module), whereby the subscriber's identity can be provided to the network. In this example, the network is a 3G (third generation) INS (Universal Mobile Telecommunications System) network. However, the present invention is not limited to use in that type of network. Only the salient parts of the network are shown in FIG. 1.

The network 3 includes a mobile core network 4 which performs 3G core network functions for permitting the terminals 1 and 2 to communicate with each other via the core network, as illustrated by links 5 and 6.

The network also includes a SIP application server 7. This is capable of serving SIP messages, as will be described in more detail below. The SIP server is capable of communicating over link 8 with the core network 4. The SIP server will typically be implemented as a general purpose server configured by software to operate according to a predetermined scheme. However, it could be implemented as dedicated hardware.

In this embodiment a web server 9 which is capable of serving page request made using HTTP (hypertext transfer protocol) is provided as part of the network. The exact means of deployment of the web server is not important, provided it is capable of serving pages to one or both of the terminals as described below. Instead of or in addition to a web (HTTP) server, a server operational according to one or more other protocols could be used.

Each of the terminals 1 and 2 includes SIP client and server applications. Typically, these will be implemented in software but they could be implemented as dedicated hardware. The SIP client and server applications of the terminals are arrange to allow sessions to be set up, broken down and otherwise controlled by means of the SIP protocol operated according to RFC 2543.

The operation of the system of FIG. 1 will now be described.

The core network 4 is arranged to use SIP server 7 to process SIP messages during the set-up of sessions to or from terminals that are connected to the network 3. To do so, core network 4 passes received SIP messages to SIP server 7 and SIP server 7 returns responses to those messages via the core network 4.

One specific aspect of the SIP server's operation is its response to the situation where, after a SIP request from the terminal of an A-subscriber to establish a session connection to the terminal of a B-subscriber, the network is incapable of establishing the session to the B-subscriber's terminal. This could happen, for instance, if the B-subscriber's terminal is not connected to the network 3 at that time. The SIP server is arranged so that in that situation it will return to the A-subscriber a message indicating a URL (uniform resource locator) or web address. The URL is conveniently one that has previously been provided to the SIP server by the B-subscriber and stored at the SIP server. The URL points to a server which is arranged to serve information in response to a request specifying that address. Conveniently, the B-subscriber will have stored at that address a web page that provides the information he wishes to give to an A-subscriber who has been unable to connect to his terminal. Audio and/or video items and/or items of other media could be embedded in the page. By downloading the page to his terminal the A-subscriber who has been unable to complete his connection can be provided with information in a variety of media.

Figure 2:
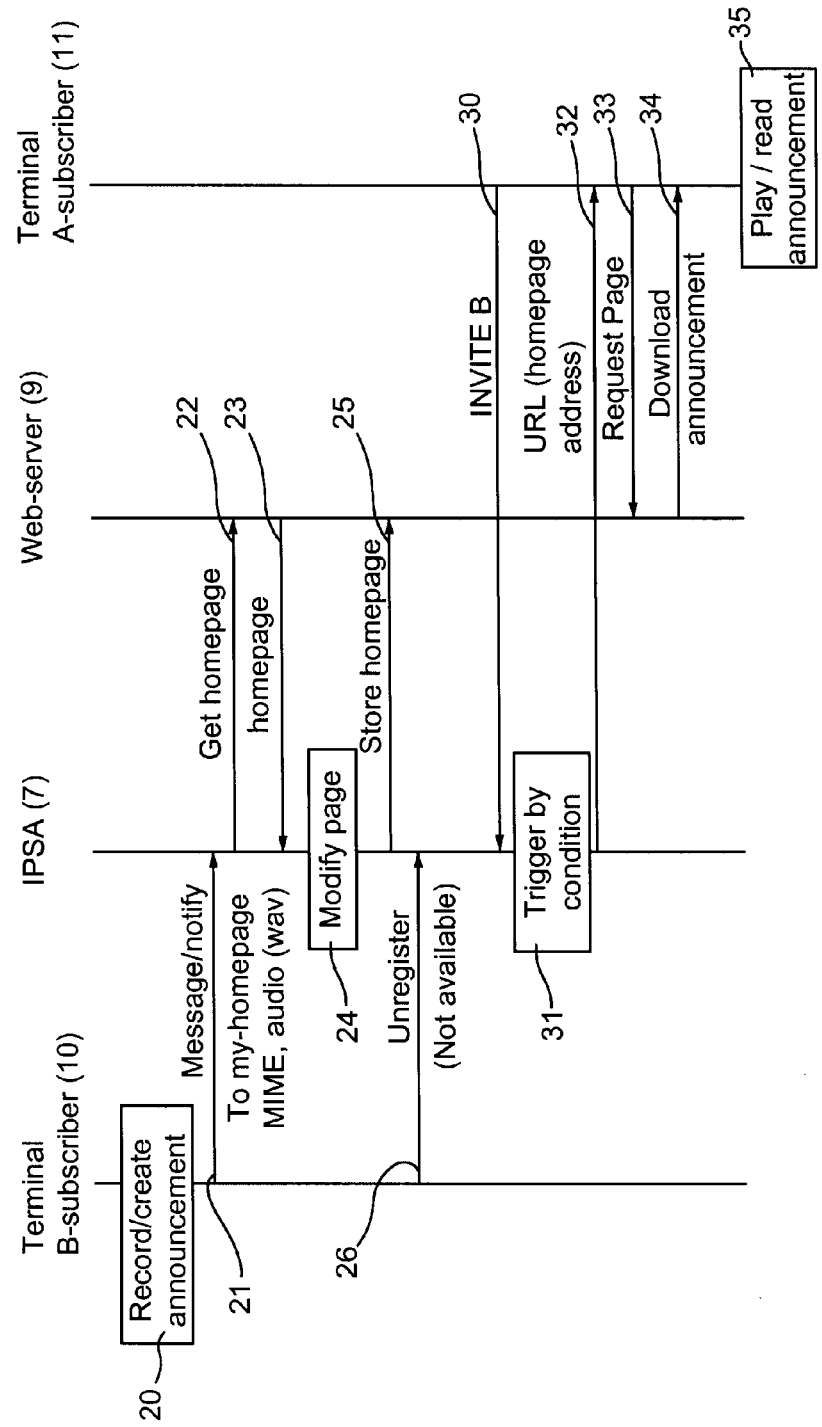
FIG. 2 illustrates an example of signalling flow for a messaging function.

One example of the operation of such a transaction will be described with reference to FIG. 2. The upper section of FIG. 2 shows the situation where a first subscriber configures the web page that is to be provided to A-subscribers who are unable to contact him. The lower section of FIG. 2 shows the situation where another subscriber tries unsuccessfully to establish a session to the first subscriber.

In the situation described in FIG. 2, the web server 9 of the network 3 is pre-configured to store a home page for each subscriber to the network. The address of the home page could be of a standard form that can be determined by the SIP server, for example:

www.[phone number of the subscriber in the network].[name of network].com so the address could be a function of one or both of an identifier of the subscriber, such as the subscriber's number, and/or an identifier of the network, such as the network's name.

Alternatively, the network 3 could comprise a database that stores a list of subscribers and the address of the home page of each subscriber.

For convenience, each home page could initially be stored with a generic content.

To modify the content of his home page a subscriber 10 (indicated as a B-subscriber in FIG. 2 for compatibility with the lower section of the figure) records or creates an audio announcement at step 20. The announcement could be a vocal message as read out by subscriber 10. The announcement is preferably stored in a widely compatible format such as .wav. The format is preferably a compressed format and preferably a digital audio format. A file containing the audio is stored temporarily at the terminal of subscriber 10.

The subscriber 10 then transmits a SIP message/notify message 21 to SIP server 7. That message includes the audio file. The file could be included in MIE (Multipurpose Internet Mail Extensions) format.

In response to receiving such a message the SIP server 7 is configured to determine the address of the home page of subscriber 10 as stored on web server 9, request the page from that address in step 22 over link 12 (FIG. 1) and then and retrieve the home page from that address (step 23).

The SIP server is configured to then modify the page according to a predetermined scheme to embed the audio file in the page. (Step 24). This can be done using MIME. An alternative would be to add to the page a cross-link to the audio file and to store the audio file at the address specified by that cross-link. Then the SIP server returns the modified page to the web server 9 for storage to replace the original page. (Step 25). This could be done using an HTTP-post method or a SIP/IMPP approach.

Subsequently the subscriber 10 unregisters from the network. (Step 26)

Referring to the lower section of FIG. 2, when another subscriber 11 wishes to initiate a session to subscriber 10, subscriber 11 (the A-subscriber for that proposed session) transmits a SIP invite message (step 30) to the network 3. That SIP invite message specifies subscriber 10 as the B-subscriber for that proposed session. The SIP invite message is passed to the SIP server 7 for processing. If the session can be connected then under the initiation of the SIP server the network establishes the session from subscriber 11 to subscriber 10. However, if the session cannot be established, this condition is determined by the SIP server. (Step 31). The SIP server is configured to, in that case, transmit to the A-subscriber 1 the address of the home page of the B-subscriber. That message is indicated at step 32. The SIP server could determine that address as a function of at least the B-subscriber's number, or from a database as described above.

On receiving the address of the home page of the B-subscriber the A-subscriber may transmit to that address a request for the page. (Step 33). The page is then served to the A-subscriber (step 34) and is displayed, played or otherwise presented to the A-subscriber by his terminal equipment. (Step 35). In this way the a variety of multimedia information stored as the B-subscriber's home page can be provided to the B-subscriber.

In the description above, the home page of subscriber 10 has been described as a web page.

Such a page could typically be coded in HTML (hypertext mark-up language) or XML (extensible mark-up language) or another mark-up language. Such a page could include and/or include links to items and/or files of a range of formats including text formats, graphic formats, audio formats and video formats. Instead of a home "page" another form of data representation could be used. For convenience the term "page" is used herein.

The home page may include a means of requesting and/or accepting input from a user to whom the page has been presented. The request may take the form of a text or audio message. The means of accepting input could be a text input box or an audio input means.

The server on which the home page is stored could be part of the network 3 or could be external to the network 3. If the server were external to the network 3 then subscriber 10 might have to use other means to alter the page's content. Wherever the server is, it is preferably responsive to a request directed to the address of the page to return the content of the page to the requesting terminal. This is conveniently achieved by means of a URL and the transfer is conveniently performed using HTTP (hypertext transfer protocol) but other means could be used instead. The address of the page is preferably an internet address.

The terminal of at least subscriber 10 suitably includes means for creating content of the web page, for example in text, audio/voice clip or video/still picture format. Such means could include one or more of a keypad, a microphone and a camera, together with means for coding, digitising, formatting, compressing and/or saving the data derived from such input means.

The terminal of at least subscriber 11 suitably includes a browser or other means of formatting and/or presenting the home page of subscriber 10. For this purpose the terminal may include a display and/or a speaker and an interpretation unit for the page. Conveniently, both terminals are capable of creating and saving messages and downloading and presenting messages.

As part of the step 32 which is performed in response to the session not being established the SIP server 7 could send a SIP message to the subscriber 10 to indicate according to the SEP protocol that the session cannot be established.

The step of requesting the home page of subscriber 10 could be performed automatically by terminal 11 when it receives the address of the home page, or could be triggered subsequently by the user of the terminal. Most preferably the terminal is configurable to allow it to operate in either of those modes. Bandwidth can usefully be saved if the subscriber 11 does not want to download the home page.

Instead of sending the address of the home page, the SIP server could send the data of the home page itself to the unsuccessful A-subscriber. To achieve this the SIP server could first download the home page from the web server 9 and then serve it to the A-subscriber. The page could be sent in a SIP message.

A web page may contain a single announcement or a plurality of different announcements. For example, a web page may contain announcements that are in the form of a video or an audio representation, a picture or a text announcement. The A-subscriber may be provided with a possibility to choose between the different announcements.

B-subscriber can be provided with one or more web pages. For example, the B-subscriber may make pages such that friends 1, 2 and 3 can be provided with URL__1, friends 4 and 5 with URL__2 and all the other callers may be provided with URL__3. The idea in here is that the B-subscriber might want to tell to friends 1, 2 and 3 where he is, but the other callers may only receive an announcement that he is not at work. In other words, the URL send to the A-subscriber can be selected based on the identity of the person who is trying to reach the B-subscriber.

The data of the home page could be sent over a different channel or a different type of channel from the one that the A-subscriber tried to open to the B-subscriber. For example, whereas the channel that the A-subscriber tried to open could have been a voice and/or circuit switched channel, the channel over which the home page data is send could be a data and/or packet switched channel.

The subscribers' terminals could be telephones, preferably mobile telephones. The telephones could be operable according to the GSM (Global System for Mobile Communications) 3G/UMTS or GPRS (general packet radio service) or derivatives thereof. Alternative terminals include personal computers and portable computers.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method, comprising:
   receiving at a telecommunication network a request from a first terminal to establish a communication session with a second terminal;
   determining at the network whether the second terminal is available to support the communication session; and
   if the second terminal is determined not to be available to support the communication session, transmitting to the first terminal the address of a data set corresponding to the second terminal; and
   if the second terminal is determined to be available to support the communication session, establishing a communication session between the first terminal and the second terminal in response to the request,
   wherein the data set is a data file of a format in which at least one of a text, audio or video element can be embedded,
   wherein the data file is formatted in a mark-up language,
   wherein the address is an address in an address space of a publicly accessible data network, and
   wherein the publicly accessible data network is the internet.

2. The method as claimed in claim 1, comprising:
   transmitting, from the first terminal to the address, a request for the data set; and
   receiving, at the first terminal, the data set.

3. The method as claimed in claim 2, wherein the first terminal is configurable to automatically transmit a request for the data set on receiving the address of the data set.

4. The method as claimed in claim 2, wherein, having received the address of the data set, the first terminal is operable, in response to user input, to transmit the request for the data set.

5. The method as claimed in claim 2, comprising presenting, by the first terminal, content of the data set to a user of the first terminal.

6. The method as claimed in claim 1, wherein the communication session is a voice communication session.

7. The method as claimed in claim 1, wherein the first terminal is configured to receive the data set over a data communication link.

8. The method as claimed in claim 1, wherein the address of the data set is transmitted to the first terminal in conjunction with an indication that the communication session cannot be established.

9. The method as claimed in claim 1, wherein the address of the data set is transmitted to the first terminal in a session initiation protocol (SIP) message.

10. The method as claimed in claim 1, wherein said data set is selected from a plurality of data sets by the first terminal.

11. The method as claimed in claim 1, wherein said data set is selected from a plurality of data sets based on information associated with the first terminal.

12. The method as claimed in claim 11, wherein the selection is based on the identity of a user of the first terminal.

13. A computer program embodied on a non-transitory computer readable medium for configuring an apparatus, the computer program being capable of configuring the apparatus to perform a process, the process comprising:
   receiving at a telecommunication network a request from a first terminal to establish a communication session with a second terminal;
   determining at the network whether the second terminal is available to support the communication session; and
   if the second terminal is determined not to be available to support the communication session, transmitting to the first terminal the address of a data set corresponding to the second terminal; and
   if the second terminal is determined to be available to support the communication session, establishing a communication session between the first terminal and the second terminal in response to the request,
   wherein the data set is a data file of a format in which at least one of a text, audio or video element can be embedded,
   wherein the data file is formatted in a mark-up language,
   wherein the address is an address in an address space of a publicly accessible data network, and
   wherein the publicly accessible data network is the internet.

14. A computer program embodied on a non-transitory computer readable medium for configuring an apparatus, the computer program being capable of configuring the apparatus to perform a process, the process comprising:
   receiving at a telecommunication network a request from a first terminal to establish a communication session with a second terminal;
   determining at the network whether the second terminal is available to support the communication session; and
   if the second terminal is determined not to be available to support the communication session, transmitting to the first terminal the address of a data set corresponding to the second terminal; and
   if the second terminal is determined to be available to support the communication session, establishing a communication session between the first terminal and the second terminal in response to the request,
   wherein the data set is a data file of a format in which at least one of a text, audio or video element can be embedded,
   wherein the data file is formatted in a mark-up language,
   wherein the address is an address in an address space of a publicly accessible data network, and
   wherein the address is a uniform resource locator.

15. An apparatus in a telecommunication network, the apparatus being configured to:
   receive a request from a first terminal to establish a communication session with a second terminal;
   determine whether the second terminal is available to support the communication session; and if the second terminal is determined not to be available to support the communication session, to transmit to the first terminal the address of a data set corresponding to the second terminal; and if the second terminal is determined to be available to support the communication session, to establish a communication session between the first terminal and the second terminal in response to the request; and wherein the data set is a data file of a format in which at least one of a text, audio or video element can be embedded, wherein the data file is formatted in a mark-up language, wherein the address is an address in an address space of a publicly accessible data network, and wherein the publicly accessible data network is the internet.

16. An apparatus in a telecommunication network, the apparatus being configured to:

receive a request from a first terminal to establish a communication session with a second terminal;

determine whether the second terminal is available to support the communication session; and if the second terminal is determined not to be available to support the communication session, to transmit to the first terminal the address of a data set corresponding to the second terminal; and if the second terminal is determined to be available to support the communication session, to establish a communication session between the first terminal and the second terminal in response to the request; and wherein the data set is a data file of a format in which at least one of a text, audio or video element can be embedded, wherein the data file is formatted in a mark-up language, wherein the address is an address in an address space of a publicly accessible data network, and wherein the address is a uniform resource locator.

17. A method, comprising:

receiving at a telecommunication network a request from a first terminal to establish a communication session with a second terminal;

determining at the network whether the second terminal is available to support the communication session; and if the second terminal is determined not to be available to support the communication session, transmitting to the first terminal the address of a data set corresponding to the second terminal; and if the second terminal is determined to be available to support the communication session, establishing a communication session between the first terminal and the second terminal in response to the request, wherein the data set is a data file of a format in which at least one of a text, audio or video element can be embedded, wherein the data file is formatted in a mark-up language, wherein the address is an address in an address space of a publicly accessible data network, and wherein the address is a uniform resource locator.

* * * * *